United States Patent
Shin et al.

(10) Patent No.: US 9,623,841 B2
(45) Date of Patent: Apr. 18, 2017

(54) APPARATUS FOR CONTROLLING WIPER MOTOR FOR WIPER SYSTEM

(71) Applicants: Hyundai Motor Company, Seoul (KR); Kia Motors Corporation, Seoul (KR)

(72) Inventors: Young Joon Shin, Whasung-Si (KR); Chan Mook Choi, Whasung-Si (KR); Yang Gi Lee, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/964,408

(22) Filed: Dec. 9, 2015

(65) Prior Publication Data

US 2016/0297402 A1 Oct. 13, 2016

(30) Foreign Application Priority Data

Apr. 9, 2015 (KR) ........................ 10-2015-0050041

(51) Int. Cl.
*G05B 5/00* (2006.01)
*B60S 1/08* (2006.01)
*H02P 3/08* (2006.01)
*H02P 7/03* (2016.01)

(52) U.S. Cl.
CPC ........ *B60S 1/08* (2013.01); *H02P 3/08* (2013.01); *H02P 7/05* (2016.02)

(58) Field of Classification Search
CPC .......... H02P 3/08; H02P 7/05; H01H 2300/02
See application file for complete search history.

(56) References Cited

U.S. PATENT DOCUMENTS

2007/0284237 A1* 12/2007 Jarrett ...................... G05G 5/06
200/52 R

FOREIGN PATENT DOCUMENTS

| JP | 3830325 B2 | 7/2006 |
|---|---|---|
| JP | 2015-61354 A | 3/2015 |
| KR | 10-1999-020202 A | 3/1999 |
| KR | 10-068176 B1 | 2/2007 |
| KR | 10-2009-0024872 A | 3/2009 |
| KR | 10-2009-0058261 A | 6/2009 |
| KR | 10-2009-0063705 A | 6/2009 |

* cited by examiner

*Primary Examiner* — Karen Masih
(74) *Attorney, Agent, or Firm* — Morgan, Lewis & Bockius LLP

(57) ABSTRACT

Disclosed is an apparatus for controlling a wiper motor for a wiper system. The wiper motor includes a double cam plate rotated by rotational force of a motor, and internal contact points formed by a P-terminal and an E-terminal disconnected/connected by the double cam plate. The double cam plate includes a first cam plate and a second cam plate for connecting the P-terminal and the E-terminal, and a center plate between the first and second cam plates. The apparatus includes a circuit line connecting the P-terminal with an off terminal of a low relay, and a control unit turning off the low relay simultaneously when the P-terminal and the E-terminal connected by the first cam plate are disconnected when a multifunctional switch is turned off. The apparatus decreases electromotive force applied to the wiper motor while the center plate is in contact with the P-terminal.

4 Claims, 7 Drawing Sheets

APPARATUS FOR CONTROLLING WIPER MOTOR FOR WIPER SYSTEM

CROSS-REFERENCE TO RELATED APPLICATION

The present application claims priority of Korean Patent Application Number 10-2015-0050041 filed on Apr. 9, 2015, the entire contents of which are incorporated herein for all purposes by this reference.

BACKGROUND

Technical Field

The present invention relates to an apparatus for controlling a wiper motor for a wiper system, and more particularly, to an apparatus for controlling a wiper motor for a wiper system for preventing a transient voltage generated when a wiper motor, to which high-voltage power is applied, is compulsorily stopped after a multifunctional switch is turned off.

Background Art

In general, a wiper system for removing foreign substances and wipe snow or rainwater on surfaces of windshield glass or rear window glass is installed in a vehicle.

The wiper system of the vehicle, which is an apparatus for wiping glass through an operation of a wiper blade rotated by a wiper motor, serves to secure a view of a driver.

The wiper system for a vehicle generally has a structure in which a rotation movement generated in the wiper motor is transmitted to pivot mechanism and a wiper arm through a wiper link, the wiper arm horizontally reciprocates, and the wiper blade moves to wipe glass.

Recently, the wiper system is controlled by an operation of the wiper motor by a body control module (BCM) within a vehicle and the like.

In the meantime, an operation mode of the wiper system includes a low mode and a high mode, and the total number of terminals of the wiper motor controlled by the BCM is four.

Among the terminals of the wiper motor, an E-terminal is a ground (−) terminal, a P-terminal is a parking control terminal, an H-terminal is a high mode terminal, and an L-terminal is a low mode terminal.

Further, the wiper motor includes a cam plate, and internal contact points formed by the P-terminal and the E-terminal connected and disconnected by the cam plate.

The cam plate is installed so as to be integrally rotated with a worm gear (worm wheel) rotated by receiving rotational force of a motor within the wiper motor, and the P-terminal of the internal contact point is connected to the E-terminal one time according to a position of the wiper blade during one rotation.

In the wiper system, the wiper blade reciprocates one time by the driving of the wiper motor during one rotation of the cam plate to wipe the glass, and in this case, the P-terminal and the E-terminal of the wiper motor are connected by the cam plate, so that the wiper blade is stopped at a predetermined parking position.

However, the wiper system in the related art may generate a transient voltage when the wiper blade enters a stop position (parking position) after a user turns off the multifunctional switch.

FIG. 1 is a diagram illustrating an example of an operation form of a cam plate for a wiper motor in the related art, FIG. 2 is a circuit diagram for a control of the wiper motor of a wiper system in the related art, FIG. 3 is a flowchart illustrating a process of controlling an operation of the wiper motor in the related art, and FIG. 4 is a graph illustrating a problem of the control of the wiper motor in the related art.

Referring to FIG. 1, the wiper motor includes a cam plate 2 installed so as to be integrally rotated with a gear part 1 (worm gear) integrally rotated with a shaft of a motor, and internal contact points formed by a P-terminal 3 and an E-terminal 4 connected and disconnected by the cam plate 2.

The cam plate 2 rotationally moves together with the worm gear 1 during an operation of the wiper motor, and disconnects the P-terminal 3 and the E-terminal 4 of the wiper motor in a normal operation section, in which a wiper blade reciprocates for one rotation, and is in contact with the P-terminal 3 and the E-terminal 4 of the wiper motor at the same time to connect the P-terminal 3 and the E-terminal 4 in a stop section, in which the movement of the wiper blade is stopped for one rotation.

Referring to FIGS. 2 and 3, in the apparatus for controlling the wiper motor in the related art, when a user turns off a multifunctional switch (not illustrated), and then the cam plate 2 is in contact with the P-terminal 3 and the E-terminal 4 of the wiper motor at the same time, and the P-terminal 3 and the E-terminal 4 are connected, 0 V is applied to the P-terminal 3, and when the BCM 6 recognizes 0 V of the P-terminal 3, the BCM contacts a low relay 8 to an off terminal 8a connected to the ground to compulsorily stops the motor.

That is, in the apparatus for controlling the wiper motor in the related art, when the BCM 6 applies (outputs) a motor stop signal after the user turns off the multifunctional switch, the low relay 8 within a junction box of an engine room is in contact with the ground (off terminal) and electromotive force applied to the wiper motor is momentarily decreased to 0 V, and the wiper motor is compulsorily stopped.

In this case, the wiper motor is compulsorily stopped in a state where high-voltage power is applied, so that a transient voltage is generated (see FIG. 4), that is, the electromotive force applied to the wiper motor sharply enters 0 V when the motor stops, so that a transient voltage is generated, and the transient voltage damages an element connected with the same power supply terminal and causes a jerking (shaking) phenomenon when the wiper blade enters the stop position (parking position).

The information disclosed in this Background section is only for enhancement of understanding of the general background of the invention and should not be taken as an acknowledgement or any form of suggestion that this information forms the prior art already known to a person skilled in the art.

SUMMARY OF THE DISCLOSURE

Accordingly, the present invention has been made in an effort to solve the above-mentioned and/or other problems, and it is an object of the present invention to provide an apparatus for controlling a wiper motor for a wiper system, in which electromotive force applied to the wiper motor sharply enters 0 V after a multifunctional switch is turned off, thereby preventing a transient voltage from being generated due to a compulsory stop of the wiper motor.

In accordance with an aspect of the present invention, there is provided an apparatus for controlling a wiper motor for a wiper system, wherein the wiper motor includes a double cam plate rotated by rotational force of a motor, and internal contact points formed by a P-terminal and an E-terminal disconnected/connected by the double cam plate, the double cam plate includes a first cam plate and a second cam plate for connecting the P-terminal and the E-terminal, and a center plate between the first and second cam plates, the apparatus comprising: a circuit line connecting the P-terminal with an off terminal of a low relay; and a control unit turning off the low relay simultaneously when the P-terminal and the E-terminal connected by the first cam plate are disconnected when a multifunctional switch is turned off, thereby decreasing electromotive force applied to the wiper motor while the center plate is in contact with the P-terminal.

The double cam plate may pass through the internal contact points in an order of the first cam plate, the center plate, and the second cam plate for one rotation by the wiper motor. The center plate may be formed to be in contact with only the P-terminal among the internal contact points of the wiper motor, so that connection between the P-terminal and the E-terminal may be released at a moment when the first cam plate passes the P-terminal and the center plate is in contact with the P-terminal as the double cam plate rotates. When the center plate passes through the P-terminal, and the P-terminal and the E-terminal are connected by the second cam plate, both the P-terminal and the E-terminal of the wiper motor may be connected to a ground.

According to the apparatus for controlling a wiper motor for a wiper system, it is possible to prevent a generation of a transient voltage due to sharp entrance of electromotive force applied to the wiper motor to 0 V when the wiper motor is compulsorily stopped, it is possible to prevent an element connected to a power supply terminal, such as the wiper motor, from being generated due to the generation of the transient voltage, it is possible to remove a Varistor necessary in a wiper motor control system in the related art and thus decrease manufacturing costs, and it is possible to decrease the effect or magnitude of an impact applied to a wiper blade when the wiper blade enters a stop position after a wiper switch of the multifunctional switch is turned off to prevent a jerking (shaking) phenomenon.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
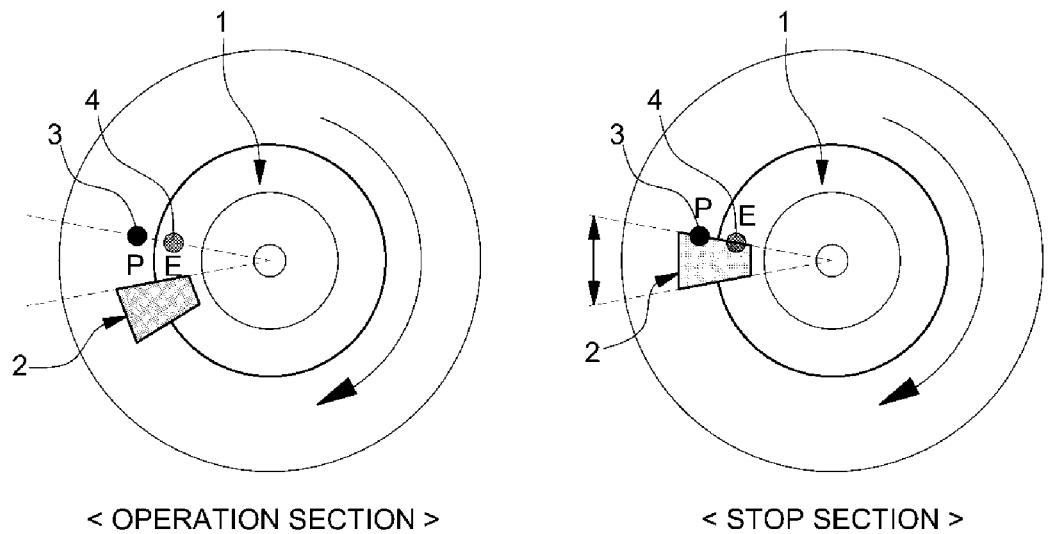
FIG. 1 is a diagram illustrating an operation form of a cam plate for a wiper motor in the related art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As described above, the wiper motor in the related art includes the cam plate 2, and the internal contact point formed by the P-terminal 3 and the E-terminal 4 connected and disconnected by the cam plate 2, and the cam plate 2 is installed to be integrally rotated with the worm gear 1, which receives rotational force of the motor within the wiper motor to rotate, and is in contact with the P-terminal 3 and the E-terminal 4 of the internal contact point of the motor in a stop section (parking position) of the wiper blade for one rotation to connect the P-terminal 3 and the E-terminal 4 (see FIG. 1).

Figure 2:
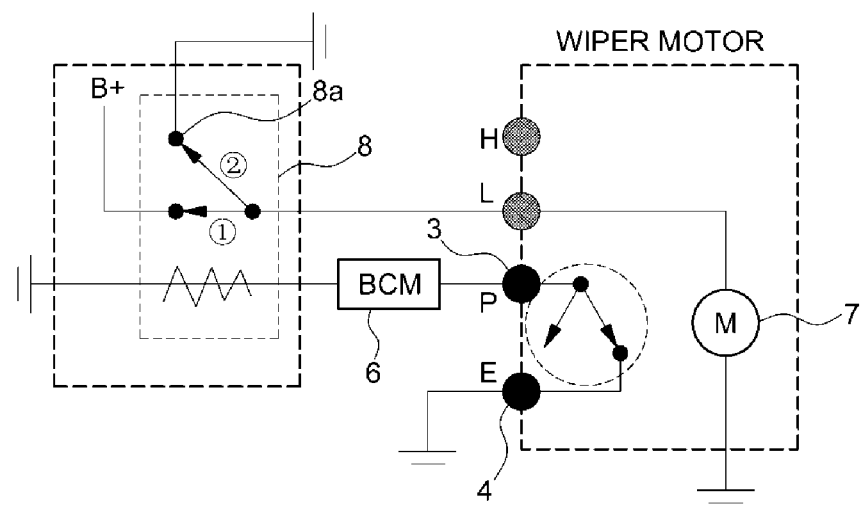
FIG. 2 is a circuit diagram illustrating an apparatus for controlling a wiper motor of a wiper system in the related art.
Figure 3:
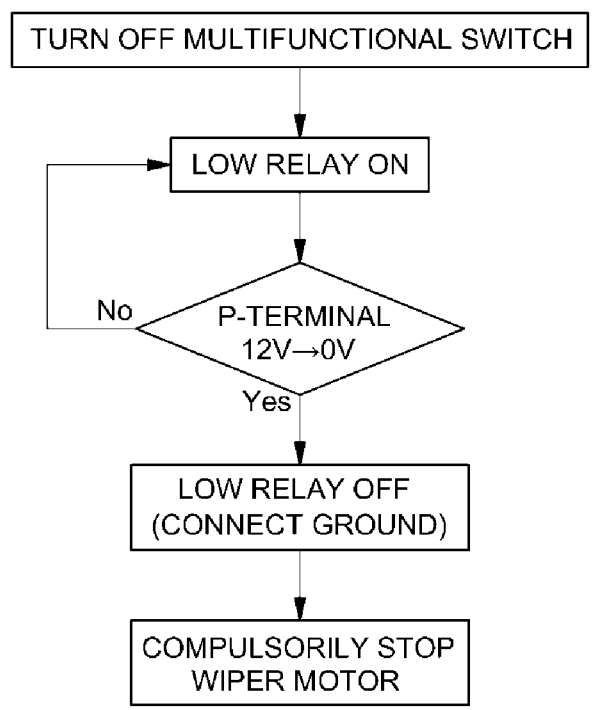
FIG. 3 is a flowchart illustrating a process of controlling an operation of the wiper motor in the related art.

However, in the apparatus for controlling the wiper motor in the related art, when the BCM 6 (see FIG. 2) applies (outputs) a motor stop signal after a user turns off the multifunctional switch, the low relay 8 (see FIG. 2) within the junction box of the engine room is in contact with an off terminal 8a connected to the ground and electromotive force applied to the wiper motor is momentarily decreased to 0 V, and the wiper motor is compulsorily stopped, and in this case, the wiper motor is compulsorily stopped in a state where high-voltage power is applied, so that a transient voltage is generated.

Figure 5:
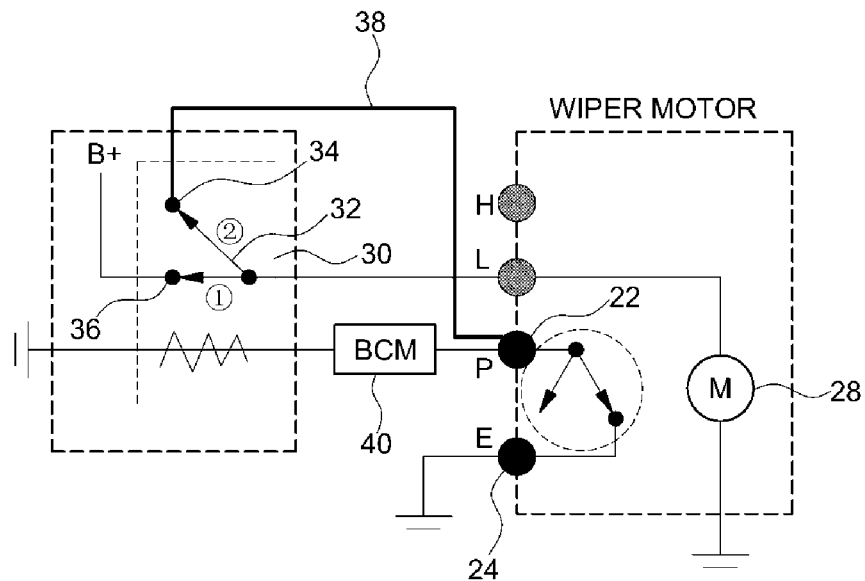
FIG. 5 is a circuit diagram illustrating an apparatus for controlling a wiper motor of a wiper system according to the present invention.
Figure 6A:
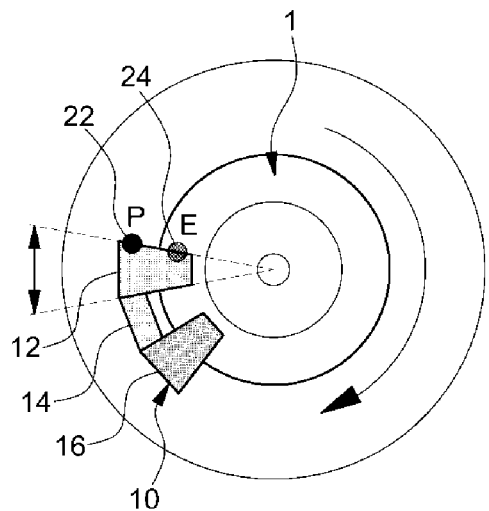
FIG. 6A, FIG. 6B and FIG. 6C are diagrams for describing connection forms between a P-terminal and an E-terminal when double cam plates for the wiper motor are rotated according to the present invention.
Figure 6B:
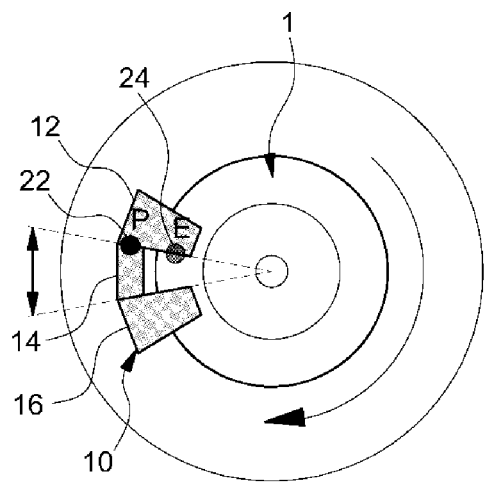
Figure 6C:
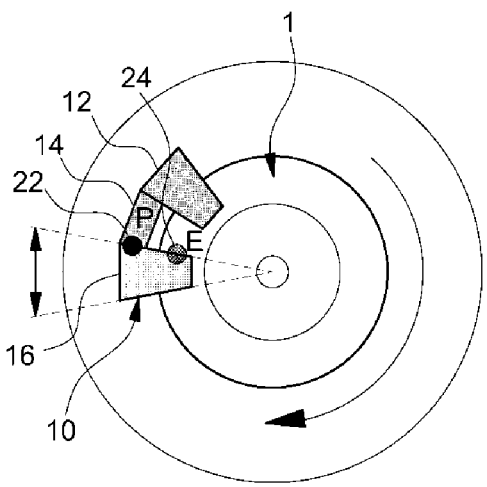
Figure 7:
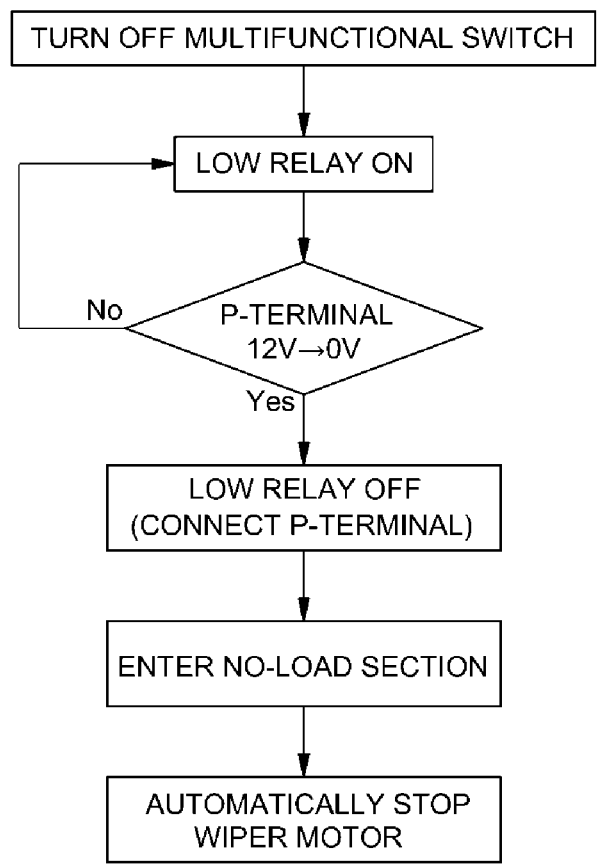
FIG. 7 is a flowchart illustrating a process of controlling a stop of the wiper motor according to the present invention.

In the present invention, in order to prevent the generation of a transient voltage or reduce the magnitude of the transient voltage when the wiper motor is compulsorily stopped after the multifunctional switch is turned off in the related art, an off terminal 34 of a low relay 30 for a wiper motor within a junction box of an engine room is connected to a P-terminal 22 of a wiper motor, not a ground, as illustrated in FIG. 5, and a double cam plate 10 having double cam plate sections, in which the P-terminal 22 and the E-terminal 24 may be connected/electrically connected, is configured as illustrated in FIGS. 6A-6C.

As can be seen in FIGS. 6A-6C, the double cam plate 10 is installed so as to be integrally rotated with the worm gear 1, and the worm gear 1 rotates by rotational force of the wiper motor, that is, by receiving rotational force of the wiper motor, similar to the cam plate in the related art.

That is, the wiper motor includes the double cam plate 10 rotate by the rotational force of the motor, and internal contact points formed by the P-terminal 22 and the E-terminal 24 disconnected/connected by the double cam plate 10.

The double cam plate 10 includes a first cam plate 12 and a second cam plate 16, which may electrically connect the P-terminal 22 and the E-terminal 24, and a center plate 14 integrally connected with the P-terminal 22 and the E-terminal 24, and the first cam plate 12, the center plate 14, and the second cam plate 16 sequentially pass through the internal contact point for one time rotation by the wiper motor.

The first cam plate 12 and the second cam plate 16 are formed to be in contact with the P-terminal 22 and the E-terminal 24 among the internal contact points of the wiper motor, respectively, at the same time during the rotation of the double cam plate 10, and when the first cam plate 12 and the second cam plate 16 are in contact with the P-terminal 22 and the E-terminal 24 at the same time, the first cam plate 12 and the second cam plate 16 electrically connects the P-terminal 22 and the E-terminal 24.

That is, the double cam plate 10 may disconnect/connect the P-terminal 22 and the E-terminal 24 by the first cam plate 12 and the second cam plate 16.

Further, the center plate 14 is formed to be in contact with only the P-terminal 22, except for the E-terminal 24, among the internal contact points of the wiper motor when the double cam plate 10 rotates, so that when the P-terminal 22 and the E-terminal 24 are connected by the first cam plate 12 and the double cam plate 10 rotationally moves by inertia of the wiper motor when the rotation of the wiper motor is stopped, the p-terminal 22, which is in contact with the first cam plate 12, passes through the first cam plate 12 (that is, the P-terminal 22 and the first cam plate 12 are disconnected, and the P-terminal 22 is connected with the center plate 14), and the connection between the P-terminal 22 and the E-terminal 24 is simultaneously released.

In the meantime, referring to FIG. 5, the P-terminal 22 of the wiper motor and the off terminal 34 of the low relay 30 are electrically connected through a circuit line 38, and a switch terminal 32 of the low relay 30 is controlled by a control unit 40, such as a BCM, to be selectively in contact with an on-terminal 36 connected to a power supply of a battery or an off-terminal 34 connected to the P-terminal 22.

The control unit 40 recognizes a contact state between the double cam plate 10 and the internal contact points of the wiper motor by a pull-up method, and when the control unit 40 recognizes an initial connection of the P-terminal 22 and the E-terminal 24 for one rotation, the control unit 40 determines that the first cam plate 12 is in contact with the internal contact point, and then when the control unit 40 recognizes a release of the connection of the P-terminal 22 and the E-terminal 24, the control unit 40 determines that the center plate 14 is in contact with only the P-terminal 22 among the internal contact points, and then when the control unit 40 recognizes the connection between the P-terminal 22 and the E-terminal 24 again, the control unit 40 determines that the second cam plate 16 is in contact with the internal contact point.

In this case, when 0 V is detected in the P-terminal 22, the control unit 40 recognizes that the P-terminal 22 and the E-terminal 24 are connected.

Hereinafter, a process of stopping the wiper motor when the wiper blade enters a stop position after the multifunctional switch is turned off will be described in more detail with reference to FIGS. 6A-6C and 7.

When a user turns off the multifunctional switch while the wiper blade moves by the driving of the wiper motor, that is, before the wiper blade reaches a parking position, the control unit 40 recognizing the turn-off of the multifunctional switch does not immediately turn off the low relay 30, and the wiper motor is driven by the power of the battery, so that the double cam plate 10 rotates until the double plate 10 is in contact with the internal contact point of the wiper motor.

When the control unit 40 recognizes that the double cam plate 10 rotationally moving to the internal contact point connects the P-terminal 22 and the E-terminal 24, the control unit 40 prepares to stop the driving of the wiper motor (that is, prepares to stop a supply of power of the battery by turning off the low relay 30).

When the P-terminal 22 and the E-terminal 24 are in contact with the first cam plate of the double cam plate 10 at the same time, the P-terminal 22 is connected with the E-terminal 24 that is the ground, so that 0 V is applied to the P-terminal.

Accordingly, when the P-terminal 22 is connected with the E-terminal 24, so that 0 V is detected in the P-terminal 22, the control unit 40 recognizes that the P-terminal 22 and the E-terminal 24 are connected by the double cam plate 10.

Then, the double cam plate 10 rotationally moves by the rotation of the wiper motor and the first cam plate 12 passes through the internal point of the wiper motor, that is, the P-terminal 22, which is being connected with the E-terminal 24, gets off the first cam plate 12 and is in contact with the center plate 14, and the control unit 40 recognizing this state makes the switch terminal 32 of the low relay 30 be connected with the off terminal 34 to turn off the low relay 30.

The supply of the power of the battery supplied to the wiper motor is stopped according to the turn-off of the low relay 30, and the double cam plate 10 rotationally moves by inertia of the wiper motor, which has been rotated, so that the center plate 14 is in contact with the P-terminal 22.

The center plate 14 is in contact with the P-terminal 22 connected with the off terminal 34 of the low relay 30 through the circuit line 38, so that the double cam plate 10 enters a non-conductive state, and in this case, the double cam plate 10 rotationally moves by inertia of the wiper motor, so that the second cam plate 16 may be in contact with the internal contact point of the wiper motor.

Before 0 V is applied to both terminals of the wiper motor, that is, in a state where the double cam plate 10 is in contact with only the P-terminal 22 by the center plate 14, electromotive force applied to the wiper motor is gradually decreased, and electromotive force applied to the wiper motor is decreased while the P-terminal 22 passes through the center plate 14.

Figure 4:
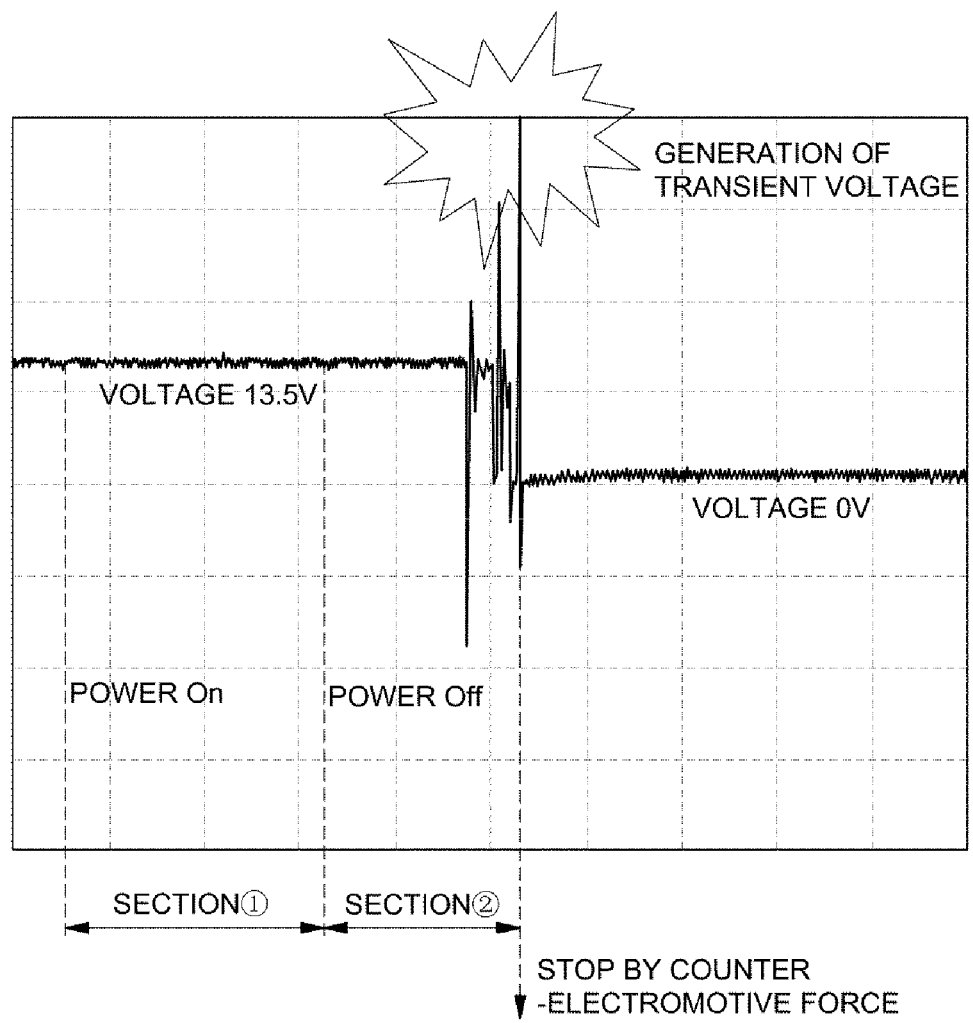
FIG. 4 is a graph illustrating a problem of the control of the wiper motor in the related art.

Accordingly, when the double cam plate 10 connects the P-terminal 22 and the E-terminal 24 by the second cam plate 16, that is, the both terminals of the wiper motor are connected to the ground, so that the rotation of the wiper motor is stopped, even though electromotive force applied to the wiper motor is decreased to 0 V, a voltage difference in this case is decreased compared to the related art (see FIG. 4), so that it is possible to solve a momentary voltage difference when the driving of the wiper motor is stopped (see FIG. 8), thereby preventing generation of a transient voltage due to a momentary voltage difference.

That is, the P-terminal 22 and the E-terminal 24 of the wiper motor are in contact and connected with the second cam plate 16 at the same time, so that 0 V is applied to the both terminals of the wiper motor and the wiper motor is automatically stopped, and a momentary voltage difference generated when the rotation of the wiper motor is stopped is solved, thereby preventing a generation of a transient voltage.

Figure 8:
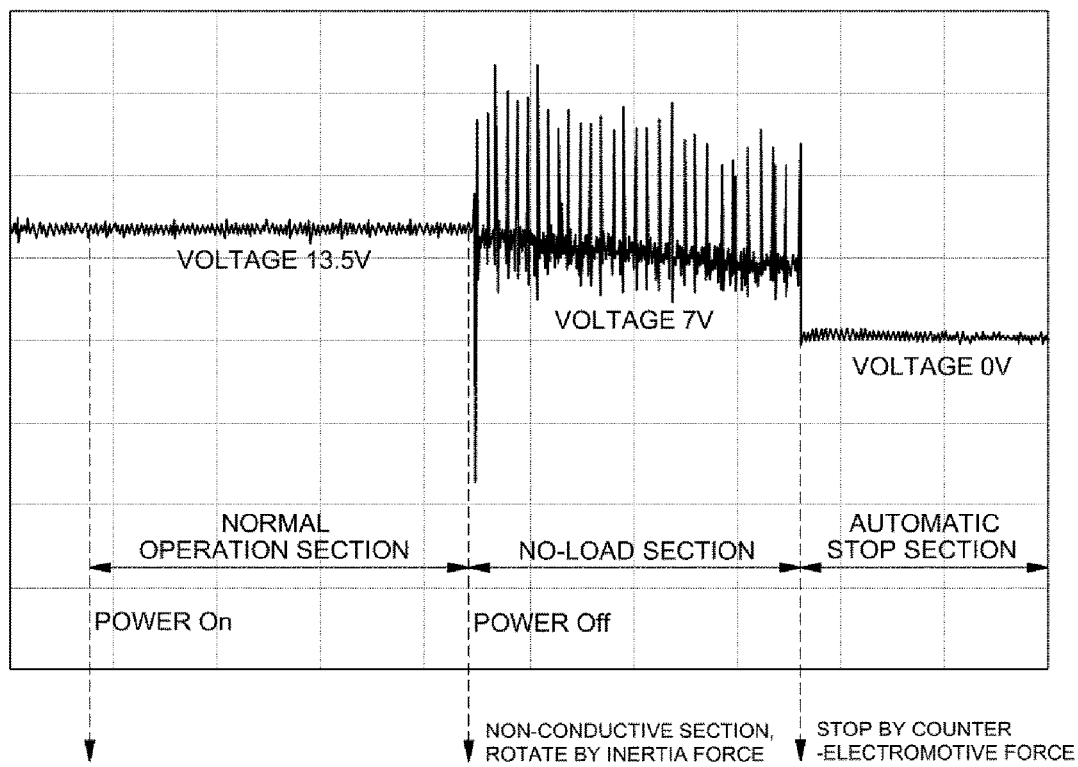
FIG. 8 is a graph illustrating an improvement effect of the control of the wiper motor according to the present invention.

In the meantime, FIG. 8 illustrates a result of a measurement and evaluation of a voltage of the wiper motor in a process of making the wiper blade enter the parking position (stop position) after the multifunctional switch is turned off by applying the wiper motor control device of the wiper system under an actual vehicle condition.

As can be seen in FIG. 8, as a result of a measurement and evaluation of voltages in a normal operation section, in which power of the battery is supplied to the wiper motor, a no-load section, in which the P-terminal of the wiper motor passes through the first cam plate of the double cam plate and is in contact with the center plate, and an automatic stop section, in which the P-terminal of the wiper motor passes through the center plate of the double cam plate and is in contact with the second cam plate together with the E-terminal, it can be seen that electromotive force of the wiper motor is gradually decreased while the double cam plate rotates by inertia of the wiper motor in the no-load section, and thus there is an effect in that a momentary voltage difference when the wiper motor is stopped in the automatic stop section is solved.

As described above, when the wiper blade enters the stop position (parking position) after the multifunctional switch is turned off, electromotive force applied to the wiper motor is decreased while the P-terminal passes through the center plate of the double cam plate, so that it is possible to prevent the generation of a transient voltage by a voltage difference when the electromotive force of the motor is sharply decreased.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling a wiper motor for a wiper system, wherein the wiper motor includes a double cam plate rotated by rotational force of a motor, and internal contact points formed by a P-terminal and an E-terminal disconnected/connected by the double cam plate, the double cam plate includes a first cam plate and a second cam plate for connecting the P-terminal and the E-terminal, and a center plate between the first and second cam plates, the apparatus comprising:
   a circuit line connecting the P-terminal with an off terminal of a low relay; and
   a control unit turning off the low relay simultaneously when the P-terminal and the E-terminal connected by the first cam plate are disconnected when a multifunctional switch is turned off, thereby decreasing electromotive force applied to the wiper motor while the center plate is in contact with the P-terminal.

2. The apparatus of claim 1, wherein the center plate is formed to be in contact with only the P-terminal among the internal contact points of the wiper motor, so that connection between the P-terminal and the E-terminal is released at a moment when the first cam plate passes the P-terminal and the center plate is in contact with the P-terminal as the double cam plate rotates.

3. The apparatus of claim 1, wherein when the center plate passes the P-terminal, and the P-terminal and the E-terminal are connected by the second cam plate, both the P-terminal and the E-terminal of the wiper motor are connected to a ground.

4. The apparatus of claim 1, wherein the double cam plate passes through the internal contact points in an order of the first cam plate, the center plate, and the second cam plate for one rotation by the wiper motor.

* * * * *